(12) United States Patent
Kuhne

(10) Patent No.: US 10,007,555 B1
(45) Date of Patent: Jun. 26, 2018

(54) DYNAMIC RESOURCE MANAGEMENT

(71) Applicant: Google Inc., Mountain View, CA (US)

(72) Inventor: Stefan Kuhne, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 0 days. days.

(21) Appl. No.: 14/562,593

(22) Filed: Dec. 5, 2014

(51) Int. Cl.
G06F 9/445 (2018.01)
G06F 9/50 (2006.01)

(52) U.S. Cl.
CPC .......... G06F 9/50 (2013.01); G06F 9/445 (2013.01)

(58) Field of Classification Search
None
See application file for complete search history.

(56) References Cited

U.S. PATENT DOCUMENTS

| | | | |
|---|---|---|---|
| 6,799,209 B1* | 9/2004 | Hayton | H04L 12/2602 709/203 |
| 7,676,581 B2 | 3/2010 | Isaacs | |
| 7,849,511 B2* | 12/2010 | Richardson | 726/26 |
| 8,606,667 B2* | 12/2013 | Ferris | G06F 9/505 705/30 |
| 2003/0169294 A1* | 9/2003 | Vatula | G06F 9/4443 715/764 |
| 2008/0034370 A1* | 2/2008 | Huizenga | G06F 9/5011 718/104 |
| 2008/0155551 A1* | 6/2008 | Yoshida | G06F 9/50 718/104 |
| 2008/0201493 A1* | 8/2008 | Richardson | 710/15 |
| 2010/0043005 A1 | 2/2010 | Ahuja et al. | |

(Continued)

FOREIGN PATENT DOCUMENTS

WO   WO 0191402 A2 * 11/2001 ......... H04L 12/2602
WO   WO 2010084479 A2 * 7/2010 ............ G06F 9/5011

OTHER PUBLICATIONS

Islam et al. "Empirical prediction models for adaptive resource provisioning in the cloud." Future Generation Computer Systems 28.1 (2012): 155-162. Retrieved on [Feb. 18, 2018] Retrieved from the Internet: URL<https://www.sciencedirect.com/science/article/pii/S0167739X11001129>.*

(Continued)

Primary Examiner — Thuy Dao
Assistant Examiner — Cheneca Smith
(74) Attorney, Agent, or Firm — McDermott Will & Emery LLP

(57) ABSTRACT

Techniques for dynamic resource management are provided. An example method includes identifying one or more applications executing on a computing device, wherein one or more user interface elements representing the applications allow switching between interaction with the applications, determining an application of the one or more applications that is presently not receiving interaction from a user, selectively reducing resources allocated to the determined application based at least on a past usage pattern of the application or predicted future interaction with the application while continuing display of a user interface element representing the application, and when the determined application is predicted to receive future interaction by the user, increasing resources allocated to the determined application prior to the predicted future interaction.

17 Claims, 6 Drawing Sheets

(56) References Cited

U.S. PATENT DOCUMENTS

| | | |
|---|---|---|
| 2010/0102200 A1 | 4/2010 | Kats et al. |
| 2010/0107084 A1* | 4/2010 | Hamilton, II ........... G06F 3/011 715/736 |
| 2012/0284543 A1* | 11/2012 | Xian ..................... G06F 1/3206 713/320 |
| 2013/0132754 A1* | 5/2013 | Hanappe .................. G06F 1/32 713/323 |
| 2013/0252597 A1* | 9/2013 | Jin ......................... H04W 4/04 455/418 |
| 2013/0283368 A1 | 10/2013 | Waddington et al. |
| 2014/0181310 A1 | 6/2014 | Gentile et al. |
| 2014/0365794 A1* | 12/2014 | Decker ................. G06F 1/3246 713/320 |

OTHER PUBLICATIONS

Wu et al. "SLA-based resource allocation for software as a service provider (SaaS) in cloud computing environments." Proceedings of the 2011 11th IEEE/ACM International Symposium on Cluster, Cloud and Grid Computing. IEEE Computer Society, 2011. Retrieved on [Feb. 18, 2018] Retrieved from the Internet:URL<https://dl.acm.org/citation.cfm?id=2007410>.*

* cited by examiner

DYNAMIC RESOURCE MANAGEMENT

BACKGROUND

The present disclosure relates generally to software applications and particularly to resources associated with such software applications.

SUMMARY

The disclosed subject matter relates to dynamic resource management.

In some innovative implementations, the disclosed subject matter can be embodied in a method. The method comprises identifying one or more applications executing on a computing device, where one or more user interface elements representing the applications allow switching between interaction with the applications, determining an application of the one or more applications that is presently not receiving interaction from a user, selectively reducing resources allocated to the determined application based at least on a past usage pattern of the application or predicted future interaction with the application while continuing display of a user interface element representing the application, and when the determined application is predicted to receive future interaction by the user, increasing resources allocated to the determined application prior to the predicted future interaction.

In some innovative implementations, the disclosed subject matter can be embodied in a machine readable medium. The machine readable medium includes instructions, which when executed by a processor, cause the processor to perform operations comprising identifying one or more applications executing on a computing device, where one or more user interface elements representing the applications allow switching between interaction with the applications, determining an application of the one or more applications that is presently not receiving interaction from a user, increasing resources allocated to the determined application when the determined application is predicted to receive future interaction by the user, where the prediction is based on at least on a past usage pattern of the application, and decreasing resources allocated to the determined application while continuing display of a user interface element representing the application when the determined application is predicted to not receive future interaction by the user.

In some innovative implementations, the disclosed subject matter can be embodied in a system. The system comprises a memory comprising instructions and a processor configured to execute the instructions to identify one or more applications executing on a computing device, where one or more user interface elements representing the applications allow switching between interaction with the applications, determine an application of the one or more applications that is presently not receiving interaction from a user, deallocate one or more resources allocated to the determined application based at least on a past usage pattern of the application while continuing display of a user interface element representing the application, and allocate the deallocated resources to another application predicted to receive future interaction by the user.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

Figure 1A:
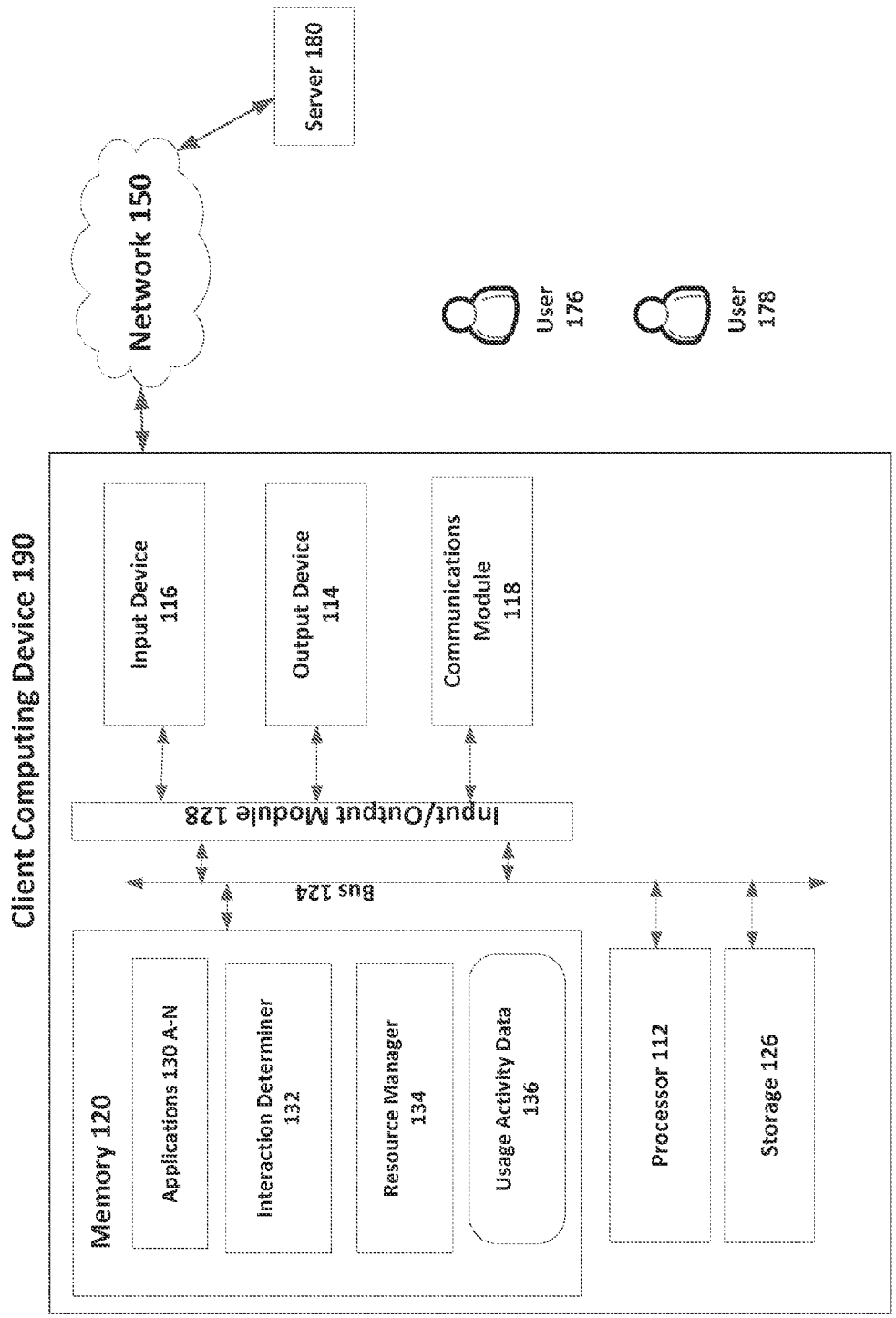
FIG. 1A is a diagram of an example device and network environment suitable for practicing some implementations of the subject technology.

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

A user may instantiate several applications on a computing device (e.g., smartphone or tablet). Computing devices generally have limited memory and processing resources to execute these applications. Often, a user may instantiate an application but not necessarily terminate the application after use. Over time, the user may instantiate several applications. These several instantiated applications may continue to consume computing device resources even though the instantiated applications may not be actively interacted with by a user. As a result, device performance slows down and applications appear less responsive to the user. This degrades user experience.

The disclosed implementations include identifying one or more applications executing on a computing device, where one or more user interface elements (e.g., icons, screenshots etc.) representing the applications are displayed within a user interface (e.g., system tray) of the computing device. The user interface elements can allow switching between interaction with the applications. An application of the one or more applications that is presently not receiving interaction from a user is determined. When the application is presently not receiving an interaction from the user, resources (e.g., memory and processor resources) allocated to the application can be selectively reduced based at least on a past usage pattern of the application or predicted future interaction with the application while continuing display of a user interface element representing the application. Thus, the user may continue to see the user interface element even when the resources consumed by the application may be reduced to a minimum (or any other value) in the background. When the application is presently not receiving interaction by the user and is predicted to receive future interaction by the user, resources allocated to the application can be increased prior to the predicted future interaction. In this way, because the resources allocated to the application can be automatically reduced during lack of interaction or automatically increased in advance of interaction, users can experience increased responsiveness from the application. This enhances user experience.

Some aspects of the subject technology include storing information regarding user accounts and software application usage activity. A user has the option of preventing storage of such information. The user may also be provided with an opportunity to control whether programs or features collect or share user information (e.g., information about the user's accounts, user's software application usage patterns, the user's preferences, etc.). Thus, the user may have control over how information is collected about the user and used by a computing device.

FIG. 1A is a diagram illustrating an example architecture for dynamic resource management according to some implementations of the subject technology. Client computing device 190 includes processor 112, memory 120, storage 126, bus 124, input/output module 128, input device 116, output device 114 and communications module 118. Memory 120 includes one or more software application(s) 130A-N, interaction determiner 132, resource manager 134 and usage activity data 136. In some implementations, client computing device 190 includes one or more modules for facilitating user interaction via a browser or web application. Client computing device 190 may include a special purpose application processing data stored at a server 180 in connection with client computing device 190 over a network 150. Client computing device 190 may be implemented as a single machine with a single processor or a multi-processor machine. Communication module 118 can enable client computing device 190 to send and receive data over network 150 to server 180.

In some implementations, the server 180 may store usage data (or any other data) related to applications 130A-N that are installed at client computing device 190. The usage data may include times of use associated with each application 130A-N and duration of use of each of applications 130A-N. In some implementations, server 180 may store social content item(s) (e.g., posted content item(s)) associated with a social networking service. Server 180 may store data related to user accounts and content items that are associated with the user accounts. For example, social server 180 can include data indicating content items that have been viewed, shared, commented on or endorsed (e.g., favored or disfavored) by a user account via applications 130A-N. Server 180 may also store authentication data (e.g., a username and password) associated with one or more social networking services or applications 130A-N.

In some implementations, client computing device 190 and server 180 can communicate with one another via network 150. Network 150 may include the Internet, an intranet, a local area network, a wide area network, a wired network, a wireless network, or a virtual private network (VPN). While only one client computing device 190 and server 180 are illustrated, the subject technology may be implemented in conjunction with any number of client computing devices 190 and servers 180. In some non-limiting implementations, a single computing device may implement the functions of client computing device 190, server 190 and other components illustrated in FIG. 1A.

Client computing device 190 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 190 may include one or more of a keyboard, a mouse, a display, or a touch screen. Client computing device 190 can include a browser or any web application configured to display webpages or any web content. For example, the browser can display a webpage including content from server 180. Alternatively, client computing device 190 may include special-purpose applications (e.g., mobile phone or tablet computer applications) for accessing and displaying content.

Figure 1B:
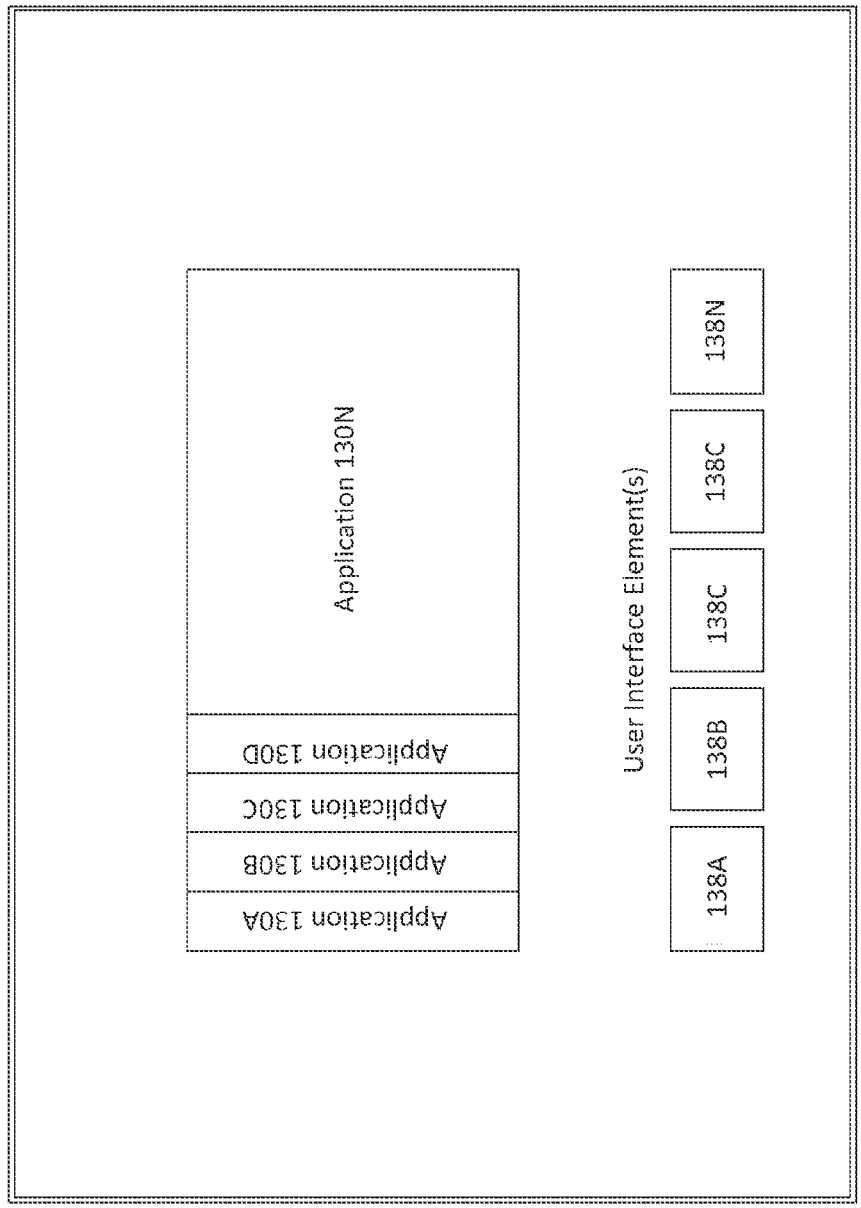
FIG. 1B illustrates an example user interface including applications and user interface elements.

FIG. 1B illustrates an example user interface including applications 130A-N and user interface elements 138A-N representing respective applications 130A-N. For example, user interface 138A may be selected to instantiate (or switch to display of) application 130A. User 176 (or user 178) may use touch gestures on a touch-sensitive display of computing device 190 to navigate through displayed applications 130A-N by touching a displayed representation of one or more applications 130A-N. It is to be appreciated that the applications 130A-N and user interface elements 138A-N displayed in FIG. 1B are illustrative and are not intended to limit the disclosed implementations. Applications 130A-N and user interface elements 138A-N are discussed further below.

As discussed above, memory 120 of client computing device 190 can include one or more software application(s) 130A-N, interaction determiner 132, resource manager 134 and usage activity data 136. In some implementations, resource manager 134 identifies one or more applications 130A-N executing on a client computing device 190, where one or more user interface element(s) 138A-N representing applications 130A-N allow switching between interactions with applications 130A-N.

In some implementations, interaction determiner 132 determines an application 130A of one or more applications 130A-N that is presently not receiving interaction from user 176. Resource manager 134 may then selectively reduce resources allocated to the determined application 130A based at least on a past usage pattern of application 130A or predicted future interaction with application 130A while continuing display of user interface element 138A representing application 130A. For example, when resource manager 134 determines that application 130A is not being used for a predetermined amount of time or has not received a pre-determined number of interactions within a predetermined amount of time, resource manager 134 may then selectively reduce resources allocated to the determined application 130A. In some implementations, when resource manager 134 determines that application 130A is likely to be used within a predetermined amount of time, resource manager 134 may then selectively increase resources allocated to the determined application 130A.

In some implementations, resource manger 134 determines an application 130A of one or more applications 130A-N that is presently not receiving interaction from user 176 and increases resources allocated to the determined application 130A when the determined application 130A is predicted to receive future interaction by user 176. The prediction may be based on at least on a past usage pattern of application 130A. In some implementations, a past usage pattern of application 130A includes at least a frequency of use of application 130A. Client computing device 190 may be used by a plurality of users (e.g., user 176 and user 178).

For example, client computing device 190 may be used by user 176's family member (e.g., user 178) when user 176 is at home and may not be used by user 176's family member when the user is at a work location. In some implementations, resource manager 134 may determine client computing device 190 is at a geographic location associated with a work address of user 176 and may automatically reduce resources to (or terminate) applications not instantiated by user 176. For example, these terminated (or resource reduced) applications may have been instantiated by user 178 at the home address associated with user 176. In other words, and with reference to the example noted above, one or more applications not instantiated by user 176 may be automatically reduced in resources, unloaded from memory or terminated when user 176 is at a particular geographic location (e.g., work address) of user 176. This example is illustrative and is not intended to limit the disclosed implementations.

Resource manager 134 may decrease resources allocated to the determined application 130A while continuing display of a user interface element 138A representing the application 130A when the application 130A is predicted to not receive future interaction by the user.

In some implementations, resource manager 134 determines an application 130A of the one or more applications that is presently not receiving interaction from user 176. Resource manager 124 may deallocate (or release) one or more resources allocated to the determined application based at least on a past usage pattern of application 130A with the application while continuing display of a user interface element representing the application, and allocate the deallocated resources to another application predicted to receive future interaction by user 176. In this way, resource manager 134 may also better manage resources available at client computing device 180.

In some implementations, to determine whether an application is not being used for a predetermined amount of time, resource manager 134 may review usage activity data 136. In some implementations, usage activity data 136 may be a database table or any data structure that may store identifiers representing applications 130A-N installed on client computing device 190 with their respective usage parameters. An application identifier may be any numeric or alphanumeric value. For example an application identifier may be "Application 130A" and a usage parameter associated with it may be a date and time at which the application was most recently used by user 176 (e.g., Jan. 2, 2014 12:05 AM). Other times at which the "Application 130A" may be interacted with by user 176 also be stored as historic data in usage activity data 136. The predetermined amount of time may be any duration of time (e.g., seconds, minutes, hours, etc.). For example, when resource manager 134 determines that application 130A has not been used or interacted with for 30 minutes, resource manager 134 may then selectively reduce resources (e.g. memory, hardware or software resources) allocated to application 130A. Usage activity data 136 may also store operations performed within application 130A (e.g., records, audio plays, mirroring application to another screen, etc.). In some implementations, usage activity data 136 may be used by resource manager 134 to determine rules regarding which resources associated with applications 130A-N can be reduced in priority or evicted to manage resources.

In some implementations, when the determined application 130A is predicted to receive future interaction by the user 176, resource manager 134 may increase resources allocated to the determined application 130A prior to the predicted future interaction. In other words, an interaction from user 176 need not be received prior to increasing resources allocated to the determined application 130A. In some implementations, the predicted future interaction is based on whether states (e.g., of the one or more applications 130B-N are similar to when the application 130A was previously executed or one or more recent tasks performed by user 130A with respect to a time of the prediction. In some implementations, the user interface elements 138A-N can be displayed in a visual tray interface element distinct from the application 130A. In some implementations, to determine whether an application is likely to be used in a predetermined amount of time, resource manager 134 may review usage activity data 136. Based on the review, resource manager 134 may determine one or more patterns in usage of application 130A. For example, resource manager may determine that application 130A is used at 1 P.M. each Friday of the week. Based on this information, resource manager may automatically increase resources (e.g. memory, hardware or software resources) allocated to application 130A at a time prior to 1 P.M. even when application 130A is not being interacted with by user 176 so that when application 130A is eventually interacted with the user at 1 P.M. the user experiences increased responsiveness from application 130A (because resources needed by application 130A have already been loaded) instead of a slow or lagging behavior that may have been associated with loading or allocation of resources. In this way, because the resources allocated to the application are automatically reduced during lack of interaction or automatically increased in advance of interaction, users can experience increased responsiveness. This enhances user experience.

Figure 2:
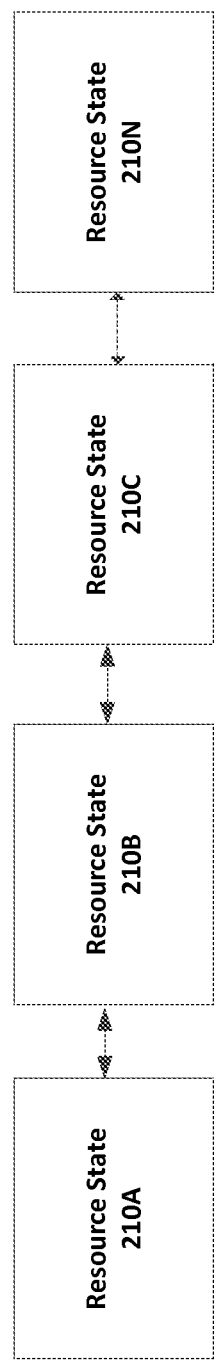
FIG. 2 illustrating example application resource states.

Referring to FIG. 2, resource manager 134 may automatically transition application 130A from resource states 210A through 210N. Each resource state may be associated with a predetermined amount of resources available to the application 130A. For example, when an application 130A is in resource state 210A, application 130A may be visible to user 176 on a display (e.g., touch-sensitive display) of client computing device 190 and may be consuming resources needed to provide a real-time interactive experience to user 176. When an application 130A is in resource state 210B, application 130A may be visible as a screenshot in a menu-bar display of client computing device 190. The screenshot may reflect the last known state of the application 130A at which a user may be stopped or reduced interaction with application 130A. In resource state 210B, application 130A may be consuming fewer resources than those consumed in resource state 210A. For example, to transition application from resource state 210A to resource state 210B, resource manager 134 may release or de-allocate resources assigned to application 130A in resource state 210A. As a purely illustrative and non-limiting example, if application 130A is assigned or using 100 megabytes (MB) of memory in resource state 210A, resource manager may deallocate 80 MB of memory to transition application 130A to resource state 210B. Thus, in this illustrative example, in resource state 210B, application 130A may consume 20 MB (100-80 MB) of memory and the de-allocated 80 MB of memory may now be made available to other applications 130B-N by resource manager 134. In some implementations, the selectively reducing resources by resource manager 134 includes transitioning the application 130A from a first predefined state of operation associated with a first set of resources to a second predefined state of operation associated with the second state of resources. The first set and the second set of resources include one or more of memory and processor resources, and where the second set of resources includes lesser resources than the first set of resources. In some implementations, after the application 130A is terminated, application 130A is restarted upon selection of the user interface element 138A representing application 130A, to a state identical or substantially similar to a state at a time of termination of application 130A. In some implementations, a rebooting process of the client computing device 190 can be expedited by selectively loading the one or more applications 130A-N based on at least past usage pattern of the applications or predicted future interaction with the applications 130A-N. For example, during a rebooting (or booting) process, only those applications (e.g., applications 130A and B) that are predicted to be used by user 176 may be loaded by resource manager 134 into memory 120 and other applications (e.g., applications 130C-N)_not predicted to be used by user 176 may not be loaded into memory 120. Thus, less time may be needed to complete the rebooting process as fewer applications may need to be loaded into memory 120. In this way, by selectively loading one or more applications 130A-N based on at least a past usage pattern of applications 130A-N or predicted future interaction with applications 130A-N a rebooting process of the client computing device 190 can be expedited.

It is to be appreciated that the use of memory as a resource is illustrative and not intended to be limiting, any other software and hardware resources may be allocated or deallocated either alone or in any combination by resource manager 134 when transitioning application 130A between resource states 210A-N.

As discussed above, when an application 130A is in resource state 210B, application 130A may be visible as a screenshot in a menu-bar display of client computing device 190. The screenshot provides an appearance that the application is "running" and is readily available for use by user 176 even though the application 130A is consuming fewer resources (in comparison to resource state 210B) in the background. When the screenshot representing the application 130A is selected by user 176, interaction determiner 132 may provide an indication of the interaction to resource manager 134. Upon receiving the indication of the interaction, resource manager 134 may automatically increase resources associated with application 130A or return application 130A to resource state 210A. Returning to FIG. 2, resource state 210C may be associated with fewer (or different) resources in comparison to resource states 210A and 210B. For example, to transition from resource state 210B to 210C resource manager 134 may further release any cached data associated with application 130A. This pattern of progressively reducing resources allocated to application 130A by resource manager 134 may continue until the application 130A is unloaded from memory 120 in resource state 210N. It is to be appreciated that when resources allocated to application 130A are to be increased (or decreased) by resource manager 134, application 130A need not transition back through each resource state 210A-N. In some implementations, resource manager 134 may operate independently of any power management (e.g., battery management) applications operating on client computing device 190. In some implementations, resource manager 134 may not check or give consideration (directly or indirectly) to a battery or power level of client computing device 190 when transitioning an application between different resource states or performing any other resource management operations.

Figure 3:
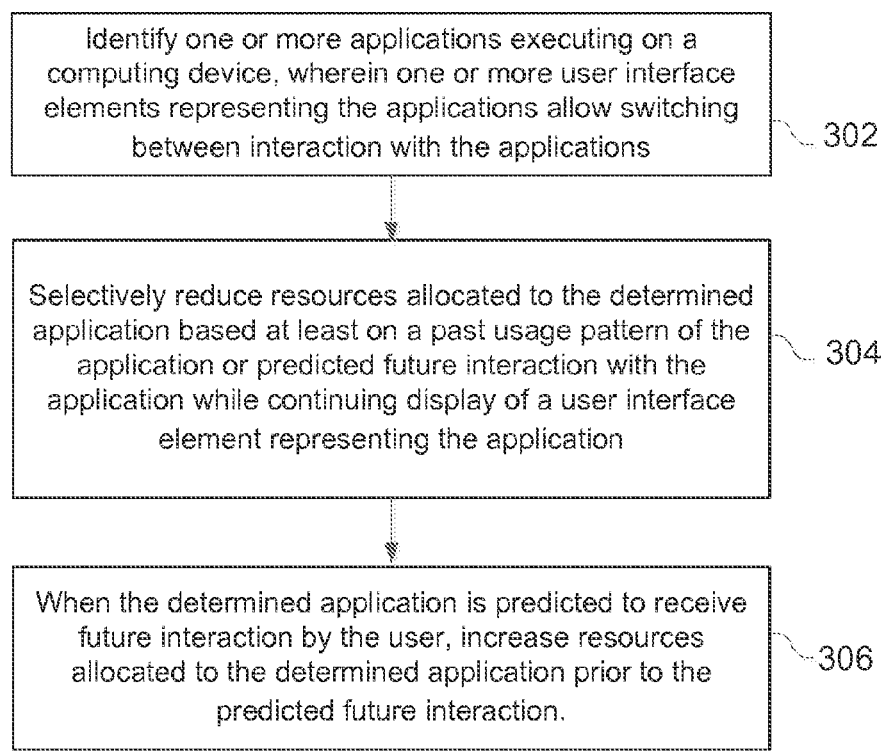
FIG. 3 illustrates an example process for practicing implementations of the subject technology using the example device of FIG. 1A.

FIG. 3 is an example process 300 for practicing implementations of the subject technology using the example architecture of FIG. 1A. Although FIG. 3 is described with reference to the elements of FIG. 1A, the process of FIG. 3 is not limited to such and can be applied within other systems.

Process 300 begins with identifying one or more applications executing on a computing device, where one or more user interface elements representing the applications allow switching between interaction with the applications (stage 302). For example, resource manager 134 may identify one or more applications 130A-N executing on a computing device 190, where one or more user interface elements 138A-N representing the applications 130A-N allow switching between interaction with the applications 130A-N. As an example user interface elements 138A-N may be displayed in a visual tray interface element distinct from the applications 130A-N.

Process 300 proceeds by determining an application of the one or more applications that is presently not receiving interaction from a user (stage 304). As an example, interaction determiner 132 may determine that application 130A is presently not receiving interaction from user 176. Resources allocated to the determined application may be selectively reduced based at least on a past usage pattern of the application or predicted future interaction with the application while continuing display of a user interface element representing the application (stage 306). As an example, resources allocated to the determined application 130A may be selectively reduced based at least on a past usage pattern of the application 130A or predicted future interaction with the application 130A while continuing display of a user interface element 138A representing the application 130A. The past usage pattern may include at least a frequency of use of the application 130A.

When the determined application is predicted to receive future interaction by the user (stage 308), resources allocated to the determined application can be increased prior to the predicted future interaction (stage 308). As an example, when the determined application 130A is predicted to receive future interaction by the user 176, resources allocated to the determined application 130A can be increased prior to the predicted future interaction. The predicted future interaction can be based on whether states of the one or more applications 130B-N are similar to when application 130A was previously executed or one or more recent tasks performed by user 176 with respect to a time of the prediction.

Figure 4:
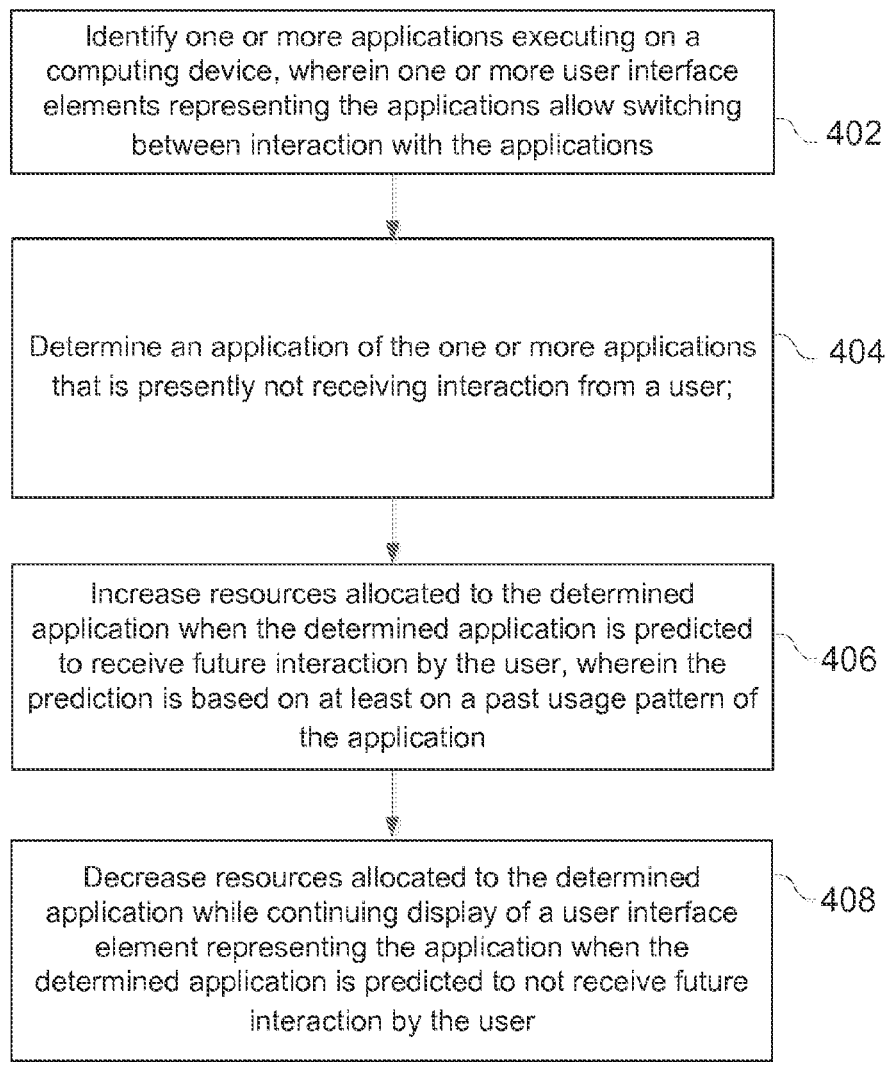
FIG. 4 illustrates an example process for practicing implementations of the subject technology using the example device of FIG. 1A.

FIG. 4 is an example process 400 for practicing implementations of the subject technology using the example device of FIG. 1A. Although FIG. 4 is described with reference to the elements of FIG. 1A, the process of FIG. 4 is not limited to such and can be applied within other systems.

Process 400 begins with identifying one or more applications executing on a computing device, where one or more user interface elements representing the applications allow switching between interaction with the applications (stage 402). For example, resource manager 134 may identify one or more applications 130A-N executing on a computing device 190, where one or more user interface elements 138A-N representing the applications 130A-N allow switching between interaction with the applications 130A-N.

Process 400 proceeds by determining an application of the one or more applications that is presently not receiving interaction from a user (stage 402). As an example, interaction determiner 132 may determine that application 130A is presently not receiving interaction from user 176. Resources allocated to the determined application may be increased when the determined application is predicted to receive future interaction by the user, where the prediction is based on at least on a past usage pattern of the application (stage 404). As an example, resources allocated to the determined application 130A may be increased based on when the application 130A is predicted to receive future interaction by user 176, where the prediction is based on at least on a past usage pattern of the application 130A.

Resources allocated to the determined application may be reduced while continuing display of a user interface element representing the application when the determined application is predicted to not receive future interaction by the user (stage 406). As an example, when the determined application 130A is predicted to not receive future interaction by the user 176, resources allocated to the determined application 130A can be reduced while continuing display of user interface element 13A representing the application.

Figure 5:
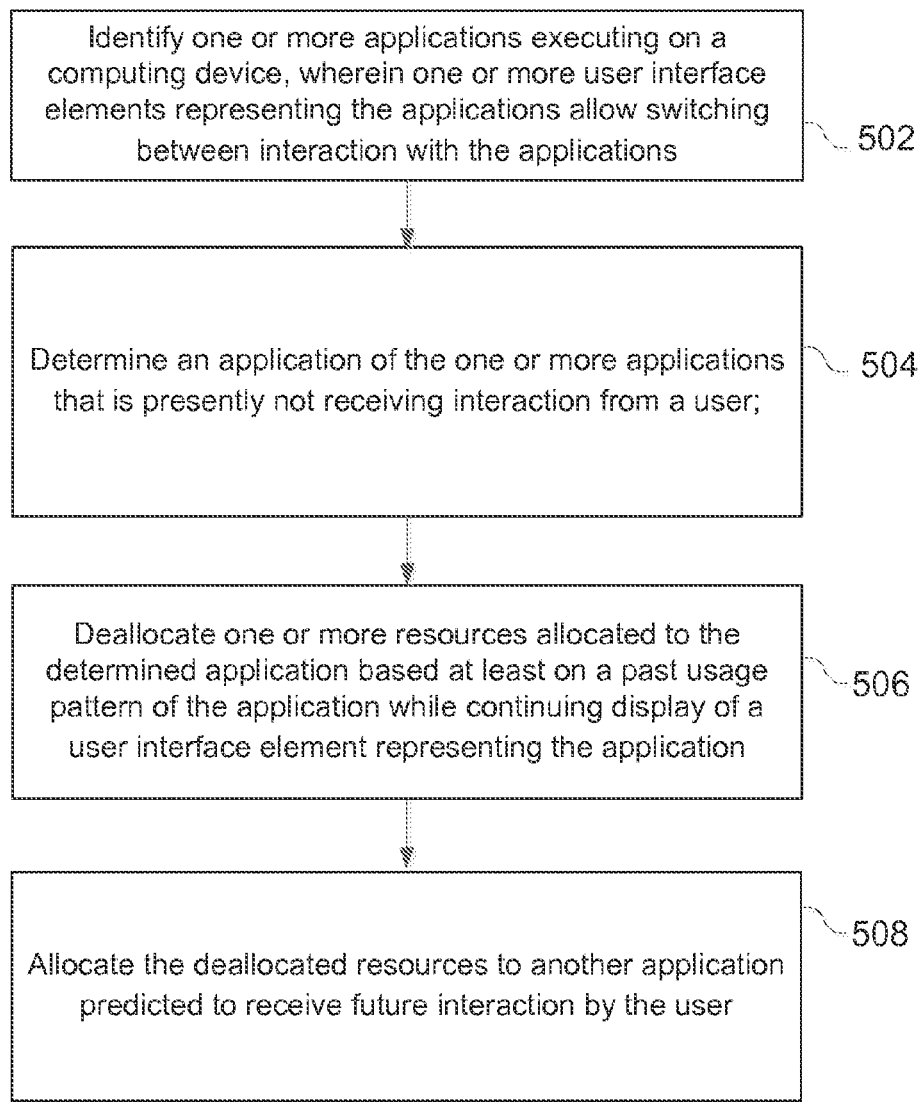
FIG. 5 illustrates yet another example process for practicing implementations of the subject technology using the example device of FIG. 1A.

FIG. 5 is an example process 500 for practicing implementations of the subject technology using the example device of FIG. 1A. Although FIG. 5 is described with reference to the elements of FIG. 1A, the process of FIG. 5 is not limited to such and can be applied within other systems.

Process 500 begins with identifying one or more applications executing on a computing device, where one or more user interface elements representing the applications allow switching between interaction with the applications (stage 502). For example, resource manager 134 may identify one or more applications 130A-N executing on a computing device 190, where one or more user interface elements 138A-N representing the applications 130A-N allow switching between interaction with the applications 130A-N.

Process 500 proceeds by determining an application of the one or more applications that is presently not receiving interaction from a user (stage 504). As an example, interaction determiner 132 may determine that application 130A is presently not receiving interaction from user 176. One or more resources allocated to the determined application are deallocated based at least on a past usage pattern of the application while continuing display of a user interface element representing the application (stage 506). As an example, resources allocated to the determined application 130A can be deallocated by resource manager 134 while continuing display of user interface element 138A representing the determined application 130A. The deallocated resources may be allocated to another application predicted to receive future interaction by the user. For example, the deallocated resources may be allocated application 130B that may have been predicted to receive future interaction by user 176.

Returning to FIG. 1A, in certain aspects, server 180 may be implemented using hardware or a combination of software and hardware, either in a dedicated server, or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, the server 180, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect- oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, coupled to bus 124 for storing information and instructions. Server 180 may be coupled via input/output module 128 to various devices. The input/output module 128 can be any input/output module. Example input/output modules 128 include data ports such as USB ports. The input/output module 128 is configured to connect to a communications module 118. Example communications modules 118 (e.g., communications module 118 and 238) include networking interface cards, such as Ethernet cards and modems. In certain aspects, the input/output module 128 is configured to connect to a plurality of devices, such as an input device 116 and/or an output device 114. Example input devices 114 include a keyboard and a pointing device, e.g., a mouse or a trackball, by which a user can provide input to the server 180. Other kinds of input devices 114 can be used to provide for interaction with a user as well, such as a tactile input device, visual input device, audio input device, or brain- computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 116 include display devices, such as a LED (light emitting diode), CRT (cathode ray tube), or LCD (liquid crystal display) screen, for displaying information to the user.

According to one aspect of the present disclosure, server 180 can be implemented using a server 180 in response to processor 112 executing one or more sequences of one or more instructions contained in memory 120. Such instructions may be read into memory 120 from another machine-readable medium, such as data storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Server 180 can be, for example, and without limitation, a desktop computer, laptop computer, or tablet computer. Server 180 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer implemented method, comprising:
   identifying a plurality of applications executing on a computing device, the plurality of applications being represented by one or more user interface elements for switching user interaction between the applications, each of the plurality of applications operating in one of a plurality of resource states;
   determining an application of the plurality of applications that is presently not receiving interaction from a user and operating in a first resource state of the plurality of resource states associated with a predetermined amount of resources for real-time user interaction;
   selectively reducing resources allocated to the determined application by transitioning the determined application to a second resource state of the plurality of resource states based at least on a past usage pattern of the application, the second resource state associated with a reduction of resources used by the determined application, wherein the selectively reducing resources includes transitioning the determined application from a default resource state associated with a first set of resources to an intermediary resource state associated with a second set of resources, wherein the first set of resources and the second set of resources include one or more of memory and processor resources, and wherein the second set of resources includes resources less than the first set of resources;
   predicting a future interaction by the user with a second application of the plurality of applications, wherein the predicted future interaction is based on whether, at a time of predicting the future interaction, states of the plurality of applications are similar to when the determined application was previously executed at a prior time from the time of predicting; and
   reallocating the resources that were selectively reduced from the determined application that the user stopped interaction with to the second application prior to the predicted future interaction based at least in part on the states of the plurality of applications being similar to when the determined application was previously executed.

2. The method of claim 1, wherein the past usage pattern includes at least a frequency of use of the determined application.

3. The method of claim 1, wherein the user interface elements are displayed in a visual tray interface element distinct from the determined application.

4. The method of claim 1, wherein after the determined application is terminated, the determined application is restarted, upon selection of a particular user interface element representing the determined application, to a state identical or substantially similiar to a state at a time of termination of the determined application.

5. The method of claim 1, wherein a rebooting process of the computing device is expedited by selectively loading the plurality of applications based on at least past usage pattern of the applications or predicted future interaction with the applications.

6. The method of claim 1, further comprising:
   determining a current location of the computing device;
   determining that a third application of the plurality of applications was instantiated by a second user at a different location from the current location of the computing device, wherein the second user is different than the user; and
   terminating the third application in response to determining that the third application was instantiated by the second user at the different location.

7. A non-transitory machine-readable medium comprising instructions stored therein, which when executed by a processor, causes the processor to perform operations comprising:
   identifying a plurality of applications executing on a computing device, the applications being represented by one or more user interface elements for switching user interaction between the applications, each of the plurality of applications operating in one of a plurality of resource states;
   determining an application of the applications that is presently not receiving interaction from a user;
   decreasing resources allocated to the determined application by transitioning the determined application to a second resource state of the plurality of resource states based at least in part on a past usage pattern of the determined application, the second resource state associated with a reduction of resources allocated to the determined application, wherein decreasing resources includes transitioning the determined application from a default resource state associated with a first set of resources to an intermediary resource state associated with a second set of resources, wherein the first set of resources and the second set of resources include one or more of memory and processor resources, and wherein the second set of resources includes resources less than the first set of resources;
   predicting a future interaction by the user with a second application of the plurality of applications, wherein the predicted future interaction is based on whether, at a time of predicting the future interaction, states of the plurality of applications are similar to when the determined application was previously executed at a prior time from the time of predicting; and
   reallocating the decreased resources that were allocated to the determined application that the user stopped interaction with to the second application prior to the predicted future interaction based at least in part on the states of the plurality of applications being similar to when the determined application was previously executed.

8. The non-transitory machine-readable medium of claim 7, further comprising:
   increasing resources allocated to the determined application by transitioning the determined application to a first resource state of the plurality of resource states associated with a predetermined amount of resources for real-time user interaction when the determined application is predicted to receive future interaction by the user, wherein the determined application is predicted to receive the future interaction based on at least on the past usage pattern of the determined application, and the past usage pattern includes at least a frequency of use of the determined application.

9. The non-transitory machine-readable medium of claim 7, wherein the predicted future interaction is based on whether states of the plurality of applications are similar to when the determined application was previously executed or one or more recent tasks performed by the user with respect to a particular time when the determined application is predicted to receive future interaction by the user.

10. The non-transitory machine-readable medium of claim 7, wherein the user interface elements are displayed in a visual tray interface element distinct from the determined application.

11. The non-transitory machine-readable medium of claim 7, wherein after the determined application is terminated, the determined application is restarted, upon selection of a particular user interface element representing the application, to a state identical or substantially similar to a state at a time of termination of the application.

12. The non-transitory machine-readable medium of claim 7, wherein a rebooting process of the computing device is expedited by selectively loading the plurality of applications based on at least past usage pattern of the applications or predicted future interaction with the applications.

13. A system comprising:
a memory comprising instructions; and
a processor configured to execute the instructions to:
identify a plurality of applications executing on a computing device, the applications being represented by one or more user interface elements for switching user interaction between the applications, each of the plurality of applications operating in one of a plurality of resource states;
determine an application of the plurality of applications that is presently not receiving interaction from a user and operating in a first resource state of the plurality of resource states associated with a predetermined amount of resources for real-time user interaction;
transition the determined application to a second resource state of the plurality of resource states based at least on a past usage pattern of the determined application, the second resource state associated with a deallocation of resources used by the determined application, wherein to transition the determined application includes transitioning the determined application from a default resource state associated with a first set of resources to an intermediary resource state associated with a second set of resources, wherein the first set of resources and the second set of resources include one or more of memory and processor resources, and wherein the second set of resources includes resources less than the first set of resources;
predict a second application of the plurality of applications will receive a future interaction by the user, wherein the predicted future interaction is based on whether, at a time to predict the future interaction, states of the plurality of applications are similar to when the determined application was previously executed at a prior time from the time to predict; and
reallocate the resources associated with the deallocation of resources of the determined application that the user stopped interaction with to the second application prior to the future interaction based at least in part on the states of the plurality of applications being similar to when the determined application was previously executed.

14. The system of claim 13, wherein the past usage pattern includes at least a frequency of use of the determined application.

15. The system of claim 13, wherein the future interaction is based on whether states of the plurality of applications are similar to when the determined application was previously executed or one or more recent tasks performed by the user with respect to a particular time that the second application has been predicted to receive the future interaction by the user.

16. The system of claim 13, wherein the user interface elements are displayed in a visual tray interface element distinct from the determined application.

17. The system of claim 13, wherein after the determined application is terminated, the determined application is restarted, upon selection of a particular user interface element representing the determined application, to a state identical or substantially similar to a state at a time of termination of the determined application.

* * * * *